United States Patent
Ishida et al.

(10) Patent No.: US 7,487,577 B2
(45) Date of Patent: Feb. 10, 2009

(54) RECYCLE METHOD AND SYSTEM THEREOF

(75) Inventors: Kenji Ishida, Tokyo (JP); Nobuya Okumura, Kanagawa (JP); Hideshi Kurihara, Matsuyama (JP); Kazuhiro Sato, Tokyo (JP); Masanori Miyamoto, Matsuyama (JP); Hiroshi Horiuti, Matsuyama (JP)

(73) Assignee: Teijin Fibers Limited, Osaka (JP)

( * ) Notice: Subject to any disclaimer, the term of this patent is extended or adjusted under 35 U.S.C. 154(b) by 449 days.

(21) Appl. No.: 10/509,942

(22) PCT Filed: Apr. 22, 2003

(86) PCT No.: PCT/JP03/05101

§ 371 (c)(1),
(2), (4) Date: Oct. 1, 2004

(87) PCT Pub. No.: WO03/090944

PCT Pub. Date: Nov. 6, 2003

(65) Prior Publication Data

US 2005/0166380 A1    Aug. 4, 2005

(30) Foreign Application Priority Data

Apr. 24, 2002  (JP) ............................. 2002-122005
Dec. 2, 2002   (JP) ............................. 2002-349632

(51) Int. Cl.
*B23P 17/04* (2006.01)
(52) U.S. Cl. .................. 29/403.1; 29/403.3; 705/28

(58) Field of Classification Search ............... 29/403.1, 29/403.3; 705/28–29; 235/385; 283/55, 283/72, 74, 79, 81; 340/572.1, 5.9–5.92
See application file for complete search history.

(56) References Cited

U.S. PATENT DOCUMENTS

| 5,965,858 | A  | 10/1999 | Suzuki et al. |
| 2002/0028080 | A1 | 3/2002 | Naito et al. |
| 2002/0185414 | A1 | 12/2002 | Morii et al. |

FOREIGN PATENT DOCUMENTS

EP     0 756 238 A1    1/1997

(Continued)

*Primary Examiner*—David P Bryant
*Assistant Examiner*—Christopher M Koehler
(74) *Attorney, Agent, or Firm*—Sughrue Mion, PLLC

(57) ABSTRACT

A recycling method which comprises constructing a membership computer system comprising appending to products identification displays showing that the products satisfy the standards for products scarcely giving loads to environments, easily recyclable products, highly healthy and safe products, or the like, connecting members comprising the producers A of the products to which the identification displays can be appended, product seller B, purchasers or consumers C, waste-collecting members D, collected commodity-transporting members E, and intermediate raw material producers F to an information network manager G through an information network, and totally monitoring and managing the production of the products, sales, wastes and the production of the intermediate raw materials by the information network manager G, and recycling the used products as wastes to the intermediate raw materials for producing the products, and by which the products can be produced with reduced energy, and the system thereof.

13 Claims, 6 Drawing Sheets

FOREIGN PATENT DOCUMENTS

| | | |
|---|---|---|
| EP | 0 977 137 A2 | 2/2000 |
| EP | 1 109 120 A2 | 6/2001 |
| EP | 1 150 258 A2 | 10/2001 |
| EP | 1 247 583 A1 | 10/2002 |
| JP | 07-331509 | 12/1995 |
| JP | 7-331509 A | 12/1995 |
| JP | 11-157523 | 6/1999 |
| JP | 2001-142950 | 5/2001 |
| JP | 2001-142950 A | 5/2001 |
| JP | 2001-277243 | 10/2001 |
| JP | 2001-277243 A | 10/2001 |
| JP | 2001-347254 | 12/2001 |
| JP | 2001-347254 A | 12/2001 |
| JP | 2002-60542 | 2/2002 |
| JP | 2002-67030 | 3/2002 |
| JP | 2002-067030 | 3/2002 |
| JP | 2002-067030 A | 3/2002 |
| TW | 404855 B | 9/2000 |
| WO | WO 02/089073 A2 | 11/2002 |

Figure 3

| No. | Production LOT No. | Product name | Raw material | Production date | Production place | Weight | Recycled raw material rate |
|---|---|---|---|---|---|---|---|
|  | SAFE | Suit | Polyester 100 | 2000/8/8 | Kawasaki-11 | 3.5 | 0.5 |
| 531 | SAFE | Suit | Polyester 65 | 2003/10/5 | Kawasaki-11 | 3.5 | 0.8 |
| 532 | SAF01105-E | Working uniform | Polyester 100 | 2003/6/3 | Kawasaki-33 | 3.2 | 0.9 |
| 533 | SAF41115 | Working uniform | Polyester 0 | 2004/11/15 | Kawasaki-33 | 3.2 | 0.9 |
| 534 | SFV | Curtain | Polyester 100 | 2002/12/14 | Nagoya | 0.5 | 1.0 |
| 535 | SFV41120-E | Curtain | Polyester 100 | 2004/11/20 | Nagoya | 0.5 | 1.0 |
| 536 | SAFE | Suit | Polyester 65 | 2004/11/20 | Kawasaki-11 | 3.5 | 0.7 |
| 537 | ANZE | Futon | Polyester 100 | 2003/8/30 | Nishikawa town-1 | 5.5 | 0.8 |
| 538 | ANZE | Futon | Polyester 100 | 2004/11/23 | Nishikawa town-1 | 5.5 | 0.8 |
| 539 | ANZE | Futon | Polyester 5 | (This shows that data are being inputted) | | | |
| 540 | SAFE | Suit | Polyester 100 | 2005/1/28 | Kawasaki-11 | 3.5 | 0.5 |
| 541 | | | | | | | |
| 542 | | | | | | | |

(continued)

| No. | Recommended recycling method | Sales date | Business date | Collection date | # 1 | # 2 | # 3 | Product production date |
|---|---|---|---|---|---|---|---|---|
|  | C, M | 2000/10/30 | 2004/10/10 | 2004/12/15 | 2004/12/22 | 2005/1/13 | 2005/1/14 | 2005/1/28 |
| 531 | C | 2004/6/10 | | | | | | |
| 532 | C, M | 2000/10/7 | 2004/12/6 | 2004/12/15 | 2004/12/22 | 2005/1/13 | 2005/1/14 | 2005/1/28 |
| 533 | C | | | | | | | |
| 534 | C, M | 2003/11/2 | 2005/1/10 | | | | | |
| 535 | C, M | | | | | | | |
| 536 | C | | | | | | | |
| 537 | C, M | 2003/11/5 | | | | | | |
| 538 | C, M | | | | | | | |
| 539 | (This shows that date are being inputted) | | | | | | | |
| 540 | C, M | | | | | | | |
| 541 | | | | | | | | |
| 542 | | | | | | | | |

1: Carry-in date in intermediate raw material producer

2: Intermediate raw material production date

3: Intermediate raw material carry-in date

Figure 6

| Kinds of substances | Names of chemical substances |
|---|---|
| Prohibited substances provided by Ordinance on Prevention of Hazards due to Specified Chemical Substances | Yellow phosphorus, benzene rubber paste, β-naphthylamine, and the like |
| The first class substances such as specified chemical substances | Polychlorinated biphenyl (PCB), benzotrichloride, and the like |
| The first class organic solvents provided by Ordinance on the Prevention of Organic Solvent Poisoning | Chloroform, carbon tetrachloride, trichloroethylene, and the like |
| Substances provided by Ordinance on the Prevention of Tetraalkyl lead | Tetraalkyl lead, triethyl-methyl lead, and the like |
| Substances which are cited in Standards related to water pollution and soil pollution and must not be detected | All cyanides, alkyl mercury, PCB, and the like |
| Harmful substances provided by Water Pollution Control Law | Cadmium and its compounds, cyanides, lead and its compounds, hexavalent chromium compounds, arsenic and its compounds, mercury compounds, trichloroethylene, dichloromethane, benzene, and the like |
| Carcinogens (carcinogenic substances against human beings) determined by Japan Association of Industrial Health | Asbestos, coal tar, vinyl chloride, ethylene oxide, chromium compounds (hexavalent), arsenic and arsenic compounds, and the like |
| Organic tin and its derivatives, halogen-containing dyes, azo dyes whose ago groups are decomposed to produce 2-naphthylamine or the like, dyes which may cause inflammation in skins, among dyes, finishers and the like | Organic tin and its derivatives, halogen-containing dyes containing tributhyl tin, dibutyl tin or the like, CI Disperse Blue 1, the same 3, the same 7, the same 26, the same 102, and the like |
| Preferentially evaluated substances among substances which are doubted to be endocrine disruptors | Tributyl tin, nonylphenol, di-butyl phthalate and the like |
| Ozonosphere-depleting substances | Trichlorofluoromethane, carbon tetrachloride, methyltetrachloride, methyl bromide, and the like |

\* 1: These substances are not detected.

\* 2: The contents of these substances are not more than the detection limits of testing laboratories.

Figure 7

| Large items | Items | Details |
|---|---|---|
| Appearances | Foreign matter | Used product highly contaminated with foreign matters and adhered to foreign matters |
| | Remarkably large | Used product exceeding a width of 600 mm and a height of 500 mm |
| Contained substances | Water content | Used product having a water content exceeding 20% |
| | Radioactive substance | Used product which may be contaminated with a radioactive substance |
| | Infectious pathogenic bacteria | Used product contaminated with infectious pathogenic bacteria, or used product which may be contaminated with infectious pathogenic bacteria |
| | Self use-prohibited substance | Used product containing chemical substances shown in Table 1 (cadmium, hexavalent chromium, cyanide, PCB, and the like) |
| Collection measures | Collection target··· polyester | Plastic product (bottle, film)<br>: content of not more than 30 percent by weight.<br>Fiber product : content of not more than 50 percent by weight |

Figure 8

| | Polyester content (percent by weight) of each site | Total polyester content (percent by weight) of raw materials | DMT recovery (percent by weight) | Product standard, pass or fail | Total used energy rate (%) |
|---|---|---|---|---|---|
| Example 1 | Main body : 70 | 73 | 59.8 | Pass | 75 |
| | Cover : 80 | | | | |
| Example 2 | Face side fabric : 80 | 65 | 55.2 | Pass | 86 |
| | Lining fabric : 100 | | | | |
| | Button : 0 | | | | |
| | rubber : 0 | | | | |
| | Other accessories : 100 | | | | |
| Example 3 | Bottle : 100 | 91 | 87.3 | Pass | 69 |
| | Label : 0 | | | | |
| | Cap : 0 | | | | |
| Example 4 | Bottle : 100 | 40 | 34.6 | Pass | 91 |
| | Label : 0 | | | | |
| | Cap : 0 | | | | |
| Comparative Example 1 | Tile : 35.5 | 38 | 29.2 | Pass | 104 |
| | Sheet : 100 | | | | |
| Comparative Example 2 | Rubber : 0 | 25 | 17.2 | Pass | 111 |
| | Cover : 0 | | | | |
| | Cushion : 31 | | | | |

RECYCLE METHOD AND SYSTEM THEREOF

TECHNICAL FIELD

The present invention relates to a recycling method suitable for a recycling-oriented society, for collecting used products (hereinafter, occasionally referred to as wastes) and then again supplying the collected products as recycled products to markets, and to a system thereof.

BACKGROUND ART

In the modern societies, various kinds of industrial products have continuously been produced in large amounts and then supplied to markets, in order to respond to the demands of the wide societies. In addition, on the production of the industrial products, a large quantity of energy has been consumed to process raw materials into various forms. However, after the products thus supplied to the markets have been used, the used products have partially been supplied to recycling processes, but most of the products have been supplied to incineration treatments or landfill treatments as wastes. Simultaneously, next new products have continuously been produced from new raw material resources and then supplied to markets.

Now, so long as the used products are not recycled, it is necessary to supply wastes comprising the increasing used products to incineration treatments or landfill treatments for dealing the wastes. Therefore, in order to reduce household garbage discarded as used product wastes, the charging of fees for the garbage has been examined and partially performed.

However, even the movements could also not have responded to the treatments of the increasing wastes in the current states, and the fact is that the above-described incineration treatments, the landfill treatments or the like have therefore unwillingly been carried out. Hence, various problems deviated from the states have been closed up, and serious problems against living environments and global environments have been caused, such as the insufficient incineration capacities of incineration plants, the shortage of landfill sites, global warming due to the production of carbon dioxide on incineration treatments, the production of harmful substances harming the health of people, the leakage of harmful substance-containing water from landfill sites, and the production of stinks.

In addition, industrial products have generally been supplied to markets through many processes, such as the mining of limited fossil fuel resources, for example, oil and coal, separation and purification processes, intermediate raw material production, final product production, and transportation. Hence, the process has accompanied the consumption of a large quantity of energy, and the total energy consumption per unit product has been expanded together with increasing in the consumption of the products. The problem in the large wasteful consumption of energy has also been closed up as a global environmental problem.

Therefore, as measures for fundamentally improving such the problem, it has socially strongly been demanded to realize a recycling-oriented society in which consumed products are reprocessed without being subjected to an incineration treatment or a landfill treatment and then reused as the recycled products. However, the realization of the recycling-oriented society in which the used products are recycled is not easy, and it is necessary for realizing the recycling-oriented society to solve various problems.

For example, in recent years, various kinds of dyes or coloring matters have been used in the products in response to commodity developments for responding to various social demands, and many chemical substances have been used for giving various functions such as an insecticidal property, a flame-protecting property, and a weather-proofing property. Large amounts of the chemical substances have been used as coating, adhesives, soil-treating agents, building materials such as plywood, woods, clothes, or floorings, and the like, and these chemical substances have nowadays been doubted to be causative agents causing indoor air pollution, sick house syndromes, chemical substance hyperesthesia, and the like. Thereby, measures such as the unemployment of these chemical substances, the removal of these chemical substances at recycling treatment stages, even when used, and the detoxication of these chemical substances have been required.

Further, industrial products have generally been made by assembling parts comprising different raw materials, respectively. For example, a suit as clothing is made up from not only a face side fabric of the suit, but also part raw materials such as a lining fabric, a collar interlining, buttons, a zipper, and sewing threads. The raw materials of these parts are generally different from each other. Thereby, in order to supply the product to recycling processes, it is, for example, necessary to divide the waste into the parts for the recycling. Since the highly complicated troublesome steps must thus be carried out, there is also a problem that the performance of the recycling is difficult. Further, there is a problem wherein the qualities of raw materials of recyclable commodities supplied to the recycling are gradually deteriorated during the recycling treatments and are inferior to the qualities of the raw materials from the first starting product, and there is also a problem that the ranges and amounts of materials capable of being supplied to the recycling must be limited.

Under such the circumstance as described above, in recent years the classified collection and recommercialization of used polyethylene terephthalate bottles (hereinafter, occasionally referred to PET bottles) have been obligated with a law. Measures that the used PET bottles are integrally collected by both administrative bodies and private bodies and then supplied to recycling treatments have been started. For examples, in JP-A 11-302443 (hereinafter, JP-A means "Japanese Unexamined Patent Publication"), a method for recycling the used PET bottle raw material to produce the highly pure polyester has been produced. However, this technique still has a problem on a point that the used raw material comprising the PET bottles and capable of being used by this method are limited to used PET bottles from which different kinds of polymers or foreign matters have sufficiently been removed.

Further, in relation to this, in JP-A 2002-60542 has been proposed a recycling method for producing dimethyl terephthalate useful as an intermediate raw material from used polyester products processed into cushion materials, floor materials, films, resin products, fiber products such as futons or uniform wears, or the like, although one or more additional installations for removing components except the polyester are necessary.

According to these conventional techniques, the used raw materials can surely partially be recycled as raw materials for producing new products without subjecting the used raw materials to an incineration treatment or a landfill treatment. Namely, these techniques try to recycle the used PET bottle raw materials, but for recycling the used raw materials into raw materials for producing new products, it is premised to collect the used raw materials. However, any method has not been proposed on a method for collecting the used raw materials in these conventional techniques.

Therefore, conventional techniques on methods for collecting the used raw materials will hereinafter be examined. For example, in JP-A 11-157523 has been proposed a method for printing advertisement on the surfaces of PET bottles and scrapping up various costs related to the collection of the PET bottles from the advertising rate income obtained from the printed advertisements. Namely, this conventional method is a method for scrapping up various costs related to the collection of the PET bottles, such as various costs for community meetings, shops, and collection traders, costs necessary for a system-managing organizer, and subscription to municipalities, and thereby for effectively collecting the PET bottles. However, this conventional method is effective with respect to a point for collecting the used products, but has not proposed any method related to a point for treating the collected used PET bottles.

DISCLOSURE OF INVENTION

The object of the present invention is to solve the above-described various problems of the conventional techniques to contribute to the construction of a recycling-oriented society required by the modern society. Namely, the object of the present invention is to establish a consistent system for effectively collecting the used products and then supplying the collected products to the recycling to form the recycling-oriented society in which resources saving and energy saving are considered. Concretely, the object of the present invention is to recycle the used products into intermediate raw materials for producing the products to provide a recycling system for supplying the products suitable for the recycling-oriented society, wherein ① products scarcely giving loads to environments can be produced with reduced energy and then supplied to markets; ② products considering the health and safety of human beings and animals and plants living together with the human beings can be supplied to markets; and ③ products whose wastes can easily be recycled can be supplied.

Hence, as the present invention for solving the above-described problems is provided "a recycling system comprising making an identification display showing that a product to be recycled satisfies a product standard from health and safety, an easily recyclable product standard, and a product standard based on an environmental load at a stage for producing the product and on an environmental load at a recycling stage, integrally appending said identification display to the product to be recycled, and managing the recyclable product circulated in a market with said identification display".

Herein, as the recycling system of the present invention, it is preferable to manage the recyclable product distributed in the market by giving management information related to the recycling, comprising the raw materials, production date, production place, production lot No., weight, quality data, recyclable raw material employment rate, and recommended recycling method for the commodity product, to the above-described identification display, visually and/or electronically reading said management information, and, if necessary, adding new management information.

Further, in the recycling system of the present invention, it is preferable for effectively collecting the used product from a consumer to pay back a prescribed amount of refund to the consumer, when the management information contained the above-described identification display appended to the used product is read and the product is consequently found to fit to prescribed standards.

Further, as the recycling system for the present invention, it is preferable to connect members including at least product producers, product sellers, members for collecting the used products, members for transporting the used products, and intermediate raw material producers, as constituent members, who jointly operate the system for recycling the products, to each other through a telecommunication network to share the management information of the above-described identification displays appended to the recycled products.

Herein, further, it is more preferable to dispose a server capable of reading and writing data for managing the products to be recycled on the above-described telecommunication network to give in accessible, readable, and writable states necessary information related to a product specified by the above-described display to a member accessed to a home page provided by said server, or, if necessary, to a non-member, in response to an authority given to each member or non-member.

Additionally, in the recycling method of the present invention, it is preferable for avoiding the contamination of a slightly recyclable product in the recycling process to evaluate whether a brought used product can be recycled or not by at least one evaluation means including a visual inspection using the identification display, a non-destructive inspection and/or a chemical analysis inspection.

Therein, it is more preferable that the receiving evaluation of the used product brought in by a non-member is approved by an information network manager integrally managing the operation of the recycling system.

The recycling system of the present invention is realized by satisfying the following requirements (1) to (5).

(1). The product to be recycled is a polyester product.
(2). The collected product is evaluated by the above-described collecting member to collect the passed product.
(3). A recommended recycling method is selected on the result obtained by the evaluation, and a new identification display is appended.
(4). The transportation destination of the collected product is confirmed with the telecommunication network, and the product is transported to the intermediate raw material producer.

And, (5). The intermediate raw material product is recycled and produced.

Therein, in the present invention, they are preferable that the product to be recycled is the polyester product and further that the composition of each part constituting the product is a composition containing a polyalkylene terephthalate in an amount of not less than 40 percent by weight, because the already proven recycling processes can be utilized.

Further, in the present invention, it is preferable to recycle the products collected for the recycling to a material recycle and/or a chemical recycle, as described in the column of "Best Mode for Carrying out the Invention" in details.

BRIEF DESCRIPTION OF DRAWINGS

FIG. 3 is an example of screen for inputting into a computer connected to the GVF network.

FIG. 6 is a table illustrating product standards and laws determined for environmental protection, health protection and the like.

FIG. 7 is a table illustrating standards for judging whether used products fit to collection standards.

FIG. 8 is a table showing the results of Examples 1 to 4 and Comparative Examples 1 to 2 by the recycling method of the present invention.

BEST MODE FOR CARRYING OUT THE INVENTION

Hereinafter, the embodiments of the recycling method of the present invention and the system thereof will be explained, while referring to Drawings.

Figure 1:
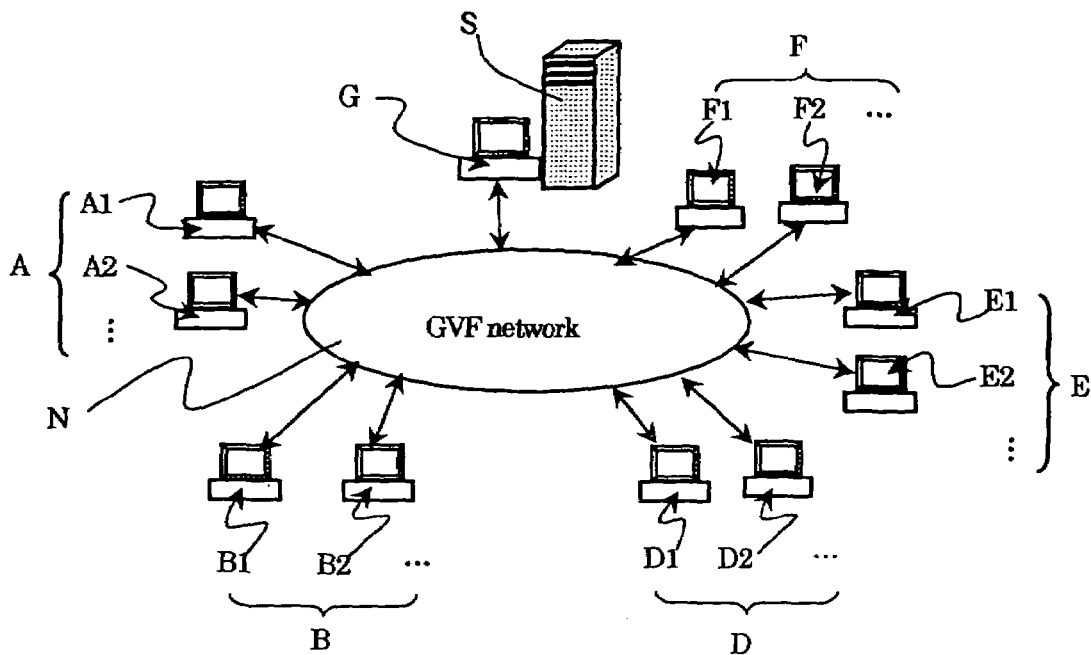
FIG. 1 is a figure showing the whole of the membership computer system.

FIG. 1 is a schematic explanatory drawing for explaining the recycling method of the present invention and the system thereof, and reference marks in FIG. 1 will first be explained. In the above-described FIG. 1, the reference marks A, B, D, E, F and G are as follows. The reference mark A is a producer (wherein, A1, A2, . . . indicate respective producers) for producing products. The reference mark B is a seller (wherein, B1, B2, . . . indicate respective sellers) for selling the products. The reference mark D is a collecting member (wherein, D1, D2, . . . indicate respective collecting members) for collecting the used products. The reference mark E is a transporting member (wherein, E1, E2, . . . indicate respective transporting members) for transporting the collected products. The reference mark F is an intermediate raw material producer (wherein, F1, F2, . . . indicate respective intermediate raw material producers) for producing intermediate raw material products. And the reference mark G is an information network manager (FIG. 1 illustrate the case of one manager, but the cases of a plurality of managers may also be included). Herein, a consumer for consuming the products is indicated with a reference mark C, but omitted in FIG. 1.

Further, the reference mark S indicates a computer system for managing the information managed by the information network manager G, and the treatments, such as the record, operation and management treatments, of necessary data are carried out with the computer system. The necessary information is transmitted from the computer system to each information terminal through the telecommunication network N such as internet. Accordingly, the computer system S plays the role of a server for transmitting information to communication terminals connected to the computer system S through the telecommunication network N or for receiving the information. Therefore, this "computer system S" is occasionally simply named "server S".

In addition, the above-described database will hereinafter complementarily further be explained. In this database are recorded the management information necessary for the operation of the recycling system, such as the product standard from health and safety, the easily recyclable product standard, and the product standard based on an environmental load at a product-producing stage and on an environmental load at a recycling stage, the product raw materials, production date, production place, production lot No., weight, quality data, recyclable raw material employment rate, and recommended recycling method of the commodity, or the management information such as the part constitution, part kinds, part raw materials, part weights, and part constitution rates of the product.

Therein, it is preferable that the recycling-related management standards of each part constituting the product are preliminarily set. Because such the preliminary setting makes it possible to input part constitutions satisfying the above-described management standards into the server S and then take out information for judging an easily recyclable property from the above-described database. And, the easily recyclable property is judged on the basis of the information by the above-described recyclable property-judging means.

Additionally, each part constituting the above-described product will hereinafter complementarily further be explained. Namely, it is preferable that the above-described product is a polyester product and has a composition satisfying the following conditional expression (1): $(\alpha_1+\beta_1+\gamma_1+ \ldots +\omega_1)/X \times 100 \geqq 40$, wherein X is the total weight of the above-described product, and $\alpha_1, \beta_1, \gamma_1, \ldots, \omega_1$ are the polyester contents of the parts, respectively. Because the management makes it possible to use an already proven recycling system as described later and further execute the efficient recycling.

Thus, an information network in which the above-described people, especially, the producer A, the product seller B, the collecting member D, the intermediate raw material producer F and the information network manager G exchange information each other through the telecommunication network N such as the internet is formed, and the recycling system is formed with the information network. Hereinafter, a group promoting the recycling system using the information network such as the internet and having the information network manager G as a core is tentatively generically called "Green Value Family" (hereinafter, occasionally referred to as "GVF"). Herein, "information network manager" is used not only simply in a narrow meaning: "computer network manager" but also in a wide meaning: "manager for collectively managing the whole of the recycling system".

The constituent members of this GVF are preferably the members of a membership system, but it is not required that the constituent members are especially limited to the members of a membership system, when satisfying the main point of the present invention. However, since the constituent members of the above-described GVF are connected to each other through the network, it is especially necessary to prevent the leakage of information which is confidential to people except the members, when the constituent members communicate each other through a public telecommunication network, such as the internet, to which unspecified many people can connect. Therefore, it is a preferable mode to form the system, for example, in such the form that the information network manager G issues authentication data such as IDs or passwords to GVF members accessing to the information-controlling server and then authenticates the members on the basis of the authentication data. Therein, if necessary, highly important confidential information may especially be communicated in the form of ciphers. Further, it is also a preferable mode that information capable of being accessed to the network is ranked and can then be accessed only by members having access rights in response to the rank.

And, when the above-described GVF network is formed to provide an environment wherein information communication terminals such as computer terminals, if necessary, cell phones, can be used, the members can freely access to the information managed by the information network manager G or to the above-described database from the information communication terminals through the public telecommunication network N such as the internet at any place in the world. The members can access to an internet domain (for example, http://www.XXX.com, http://www.XXX.co.jp) which specifies the home page of the information-supplying side server S for supplying necessary information through such the public telecommunication network N.

When the product-recycling system is thus constructed, it is one of important requirements that participants can freely access to the GVF network (also simply referred to as "GVF net") even in any region without relating to GVF members or not, because the participants are variously complicated as shown in the above-described FIG. 1. However, such the requirement is very important, but not essential. If necessary, a method wherein ISDN lines for connecting the GVF members to each other are used to construct a telecommunication network, a method wherein optical fibers for connecting the GVF members to each other are used to form a LAN (Local Area Network), or the like, may "of course" be adopted.

Therein, it is, of course, preferable that products handled in GVF fit to such the product standards, various laws and regulations as shown in FIG. 6 determined for environmental protection, health protection, and the like on their properties. Namely, the product group to be handled in the recycling system related to GVF should, of course, be considered on natural environment protection, safety or plants, animals including human beings, and the like, also at the start point. At least at a stage for first producing the product, it is needed that the product group fits to standards illustrated in FIG. 6.

Figure 2:
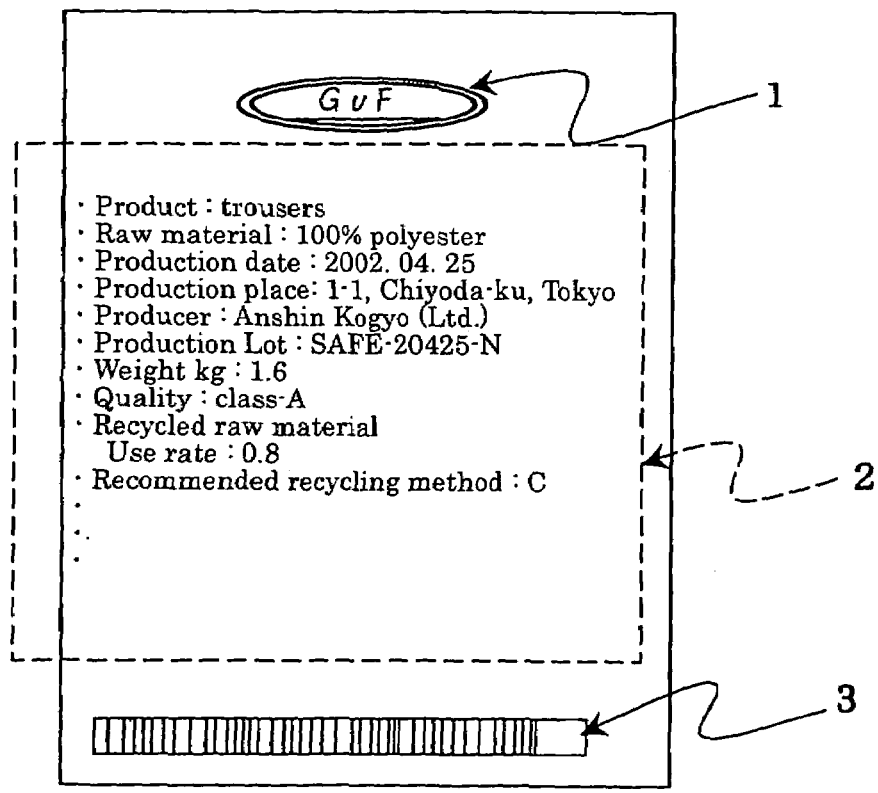
FIG. 2 is an identification display showing that a product satisfies product standards.

In the present invention, the producer A joined to GVF appends "identification display" to products, and sells the products to the product seller B joined to GVF. Herein, the "identification display" comprises, for example, a log mark 1, product information 2, electronically readable information 3, and the like, as shown in FIG. 2, and shows that the recyclable products satisfy a product standard from health and safety, an easily recyclable product standard, and a product standard based on an environmental load at a stage for producing the product and on an environmental load at a recycling stage.

Therein, it is desirable that the above-described logo mark 1 is a mark which declares that the product is a product fit to GVF standards, emphasizes that the product promotes actions friendly to environments and human beings, while giving priority to considerations on the environments and the human beings, and images the cooperation of the consumer C with the enterprise groups A, B, D, E, F and G. As the product information 2 are described the name, raw material, production date, production place, production lot No., weight, recyclable raw material use rate, recommended recycling method, and the like of the product.

Further, the electronically readable information 3 is information which supplements information such as the above-described product information and can electronically be read. A bar code method is usually employed for the electronically readable information 3 as illustrated, but other methods such as a microchip method, a magnetic recording medium method or an IC card method may be employed without limiting to the bar code method.

However, since a form for displaying the above-described "information display" depends on various elements such as a product shape, a using environment, a using method and a distribution form, the "identification display" may suitably be displayed by a method suitable for each product. Of course, the attachment of the electronically readable information 3 to the product is preferable on the mechanical treatment of necessary information related to the product as described below, but the information may visually be read by a person, for a product to which the attachment of the information is impossible. Therein, an attention may be paid so that necessary information is not lost from "identification display" during the employment of the product, or display design may be devised in response to the product.

Before appending an identification display to the above-described product and then selling the product to the product seller B joined to GVF, the producer A joined to GVF and producing the product first accesses to the server S managed by the information network manager G through the already described GVF net, and inputs management information necessary for the produced product. Herein, the management information is information needed for the operation of the recycling system of the present invention, and includes a product name, product raw materials, a sales amount (ml) to the seller B, a production lot, a production date, a sales date, and product standards. A series of these data are clearly classified, for example, as data DA1, DA2, . . . for each product and then inputted into production item columns, respectively. One example of input display for inputting the above-described data DA1, DA2, . . . is shown in FIG. 3 for reference.

Subsequently, the seller B joined to GVF and selling the products that a series of the related data DA1 have been inputted as described above inputs the name and sales amount (m2) of the selling products from an input means attached to an information communication terminal or the like into the server S through the GVF net, when said products are sold to the consumer C or the like. Consequently, the server S connected to the GVF net instantaneously calculates that the amount of (m1−m2) among the products corresponding to the inputted data DA1 is left in the seller B and further that the amount of m2 is distributed in the market and used by the consumer C, and then holds the calculation results in a state capable of being inspected by GVF members accessing to the prescribed home page on the GVF net and having prescribed authority. At the time, the recycling information of parts constituting the product, namely, the kind, weight, constitution, and the like, of each part, and the specified content of a recycling-inhibiting substance for inhibiting the recycling, or the like are, if necessary, also inputted into the above-described database managed and controlled with the server S. Thereby, management information related to recycling can be taken out from the management standards set for the parts constituting the above-described product in the above-described data base, and the taken management information can be referred to judge the easily recyclable properties of the above-described product and its constituent parts by the recyclability-judging means. The above-described recyclability-judging means may be disposed as a separated device independent from the above-described server S, but it is preferable that the recyclability-judging means has a program necessary for a memory device disposed in the server S and carries out the judgment treatments according to procedures determined by the program.

By the way, it is a characteristic in the recycling system of the present invention that the product seller B joined to GVF sells the products to the consumer C, while adding a constant recycling-promoting cost to the selling price of each of the products. Namely, by the adoption of such the characteristic sales method, the recycling of the used products can be promoted from the below-described reason.

First, when finishing the employment of the product, the consumer C brings the used product in the product seller B. Then, the seller B confirms whether the brought product is a product fit to collection standards or not, from the above-described identification display by an electrical means and/or a visual means, receives the used product, and pays back the added cost to the consumer. Therein, for minimizing troubles with the consumer C, it is preferable that the judgment whether the used product fits to the collection standards or not is carried out, for example, according to standards shown in FIG. 7. But, the added cost whose repayment is not demanded within a determined period is transferred to the GVF information network manager G.

By the adoption of the above-described method, the consumer C returns the used product to the seller B and can receive the refund. Therefore, the consumer C brings most of the used products in the seller C without scrapping the used products as refuses or illegally throwing away the used products, thereby enabling the smooth achievement of the recycling system. Therein, the seller B may freely perform sales promotion measures, such as the saving of the refunds in a private bank account on the request of the consumer C as a system for paying back the refunds to the consumer C, or the performance of a special service for the consumer, when a total purchase amount exceeds a constant amount.

Therein, when the convenience of the consumer C and the like are considered, it is preferable that the refund of the cost added to the price of the used product (hereinafter, occasionally called "waste") brought by the consumer C can be received not only from a seller B1 from who the product is purchased, but also from other member sellers B2, B3, . . . on the basis of the identification display appended to the product. The reasons are that the information of the waste brought by the consumer C is managed as the database in the server S, even when such the system is adopted, and that the other member sellers B2, B3, . . . can also read the identification display appended to the brought waste, instantaneously take out the information from the server S on the GVF network, and confirm the feature of the waste from the taken information.

Additionally, notes related to the product seller B in such the general recycling system are to reduce that sold products fit to the standards and sold products not fit to the products are together scraped as general wastes to be treated in a city, town or village, and to prevent that the non-fit products are added to the recycling product distribution route of GVF in the waste collection process. When the seller B receives the waste from the consumer C or the like, the seller B fundamentally confirms with the identification display, but it is preferable on the smooth operation of the recycling system without causing a trouble that the waste is sufficiently confirmed to be a recyclable waste by measurement•evaluation using one or more evaluation means including chemical analysis inspection and non-destructive inspections such as near infrared analysis, when the information of the waste can not be confirmed with a visual inspection or with an electronically reading means.

Subsequently, as described above, the product seller B received the waste knows whether the waste is a waste suitable for the recycling or not, from the identification display through the GVF net, when the seller B receives the waste. When the waste is suitable for the recycling, the seller B inputs the product name, quantity ($m^3$), date, and the like, of the received waste into the corresponding columns. And, the received wastes are stored, until the quantity of the stored wastes reaches a quantity suitable for transportation, while giving consideration to a waste-storing place, a transportation cost, and the like. Thereby, the managing information related to the recycling can be taken out from the managing standards set to the parts constituting the above-described product in the above-described database, and the taken managing information can be referred to judge the easily recyclable properties of the above-described product and its constituent parts.

The stored wastes are collected by the collecting member D. When collecting the stored wastes, the collecting member D sufficiently confirms whether the stored wastes are recyclable wastes or not, by the same evaluation method as that of the above-described product seller B, and then receives the wastes. Simultaneously, the identification displays are referred to on the GVF net to specify the products corresponding to the wastes, and the necessary information of the wastes, such as product name, quantity, date, and the like, appended to the wastes are inputted into specified product columns. And the wastes are stored until collected in a proper quantity. Of course, the above-described seller B may be a selling and collecting member (as a matter of convenience, described with a mark B') also integrally carrying out the collection business of the collecting member D.

The used product-collecting member D or the selling and collecting member B' receives the added cost paid to the seller B or the customer C from the GVF information network manager G. Simultaneously, the collecting member D not working as the seller B confirms the product name, storage quantity, storage place, and the like of the recyclable wastes stored by the seller B on the GVF net, suitably collects the recyclable wastes, and simultaneously concentratedly stores the collected wastes in its own warehouse or in a storage warehouse processed by GVF as a group. Therein, the collecting member D for collecting the used products and the below-described transporting members E for transporting the collected products may have separated business conditions, respectively, or may be a collecting and transporting member (as a matter of convenience, described as a mark: D') integrally having both the collecting business and the transporting business. The case of the collecting and transporting member D' will be explained in the following example.

The business of the above-described collecting and transporting member D' is to transport the wastes collected from the product seller B, the own warehouses and the GVF net storage warehouses to the intermediate raw material-producing member F. Thereby, the collecting and transporting member D' always confirms the product name, product raw material, quantity, and storage place of the baggage to be transported on the GVT net, makes such a collecting operation plan as enabling an efficient collecting•transporting activity, and fulfills a duty for transporting the baggage to the intermediate raw material-producing member F. Further, the collecting and transporting member D' confirms products corresponding to the wastes on the basis of identification displays appended to the wastes to specify the products, and then inputs the product name, product raw material, quantity, date, and the like of the collected and transported wastes into the data columns of the specified products in the database with an input means attached to an information communication terminal or the like. Therein, if necessary, recycling information related to the parts constituting the products, such as the kinds, weights, constitutions of the parts, and the contents of recycling-inhibiting substances inhibiting the recycling, are, of course, inputted into the above-described database managed and controlled with the server S. Thereby, the managing information related to the recycling can be taken out from the managing standards set to the parts constituting the above-described products in the above-described database, and the taken managing information can be referred to judge the easily recyclable properties of the above-described products and their constituent parts.

Herein, a system for the effective collecting transporting activities of the collecting member D, the collecting and transporting member D', and collected commodity-transporting member E may be such a system as calculating a schedule, an efficient transportation route, and the like with the server S on the basis of the managing information occasionally inputted and recorded in the server S according to the direction of the collecting and transporting member D' as described above and then displaying the results to assist the business of the collecting and transporting member D'. Further, preferable is a system in which the collecting member D, the collecting and transporting member D', and the transporting member E can, if necessary, perform the change in a packaging style including repackaging for improving the efficiency of a transportation means.

However, when a series of changes such as the change in the packaging style are performed, the form and specifications of the recycling products are occasionally different from those of the original products. Therefore, a series of data comprising the wastes and the recommended recycling method, quantity, recycling raw material rate, and the like of the wastes are processed, and various kinds of the obtained necessary information are summarized to form a new identification display. The new identification displays are appended to the changed wastes, and the change is further inputted into the GVF database disposed in the server S.

A series of the above-described works, and an evaluation for showing that the collected wastes are recyclable wastes as on-specification products, or collected on-specification products by a visual inspection from identification displays and/or by at least one reliable evaluation means such as a non-destructive inspection, for example, near infrared analysis, are preferable modes on the smooth operation of the recycling system. By the evaluation, the intermediate raw material producer F for recycling the collected wastes as an intermediate raw material can previously prevent the development of an abnormal quality on the production of the intermediate raw material. The collecting member D, the collecting and transporting member D', and the transporting member E select the intermediate raw material producer F capable of suitably recycling the wastes, on the basis of a recommended recycling method indicated in the identification displays appended to the collected products and, then transport the wastes to the selected intermediate raw material producer F. In addition, the acceptance evaluation of used products brought by a person except the GVF members is carried out by the collecting member D, the collecting and transporting member D', and the transporting member E, and the final judgment of the acceptance is performed by the information network manager G on the basis of the result of the evaluation.

Thus, the wastes brought by the collecting member D and the like are transferred to the intermediate raw material producer F, and then recycled into the intermediate raw material by the intermediate raw material producer F through a prescribed process. For the quality evaluation of the wastes received by the intermediate raw material producer F, the evaluations of the collecting member D, the collecting and transporting member D', and the transporting member E are utilized, but since the intermediate raw material producer F must bear the responsibility for the final quality of the intermediate raw material product, it is a preferable mode that the intermediate raw material producer F, if necessary, confirms the quality of the received wastes by a sampling inspection method. A process for producing the intermediate raw material from the wastes thus brought in the intermediate raw material producer F includes a process (occasionally called "material•recycle" in the present invention) for applying physical treatments, such as simple washing, thermal deformation, cutting, and disassembly into constituent parts, to the wastes to produce the intermediate raw material, and a process (occasionally called "chemical•recycle" in the present invention) for applying considerably complicated chemical treatments to the wastes to produce the intermediate raw material. The wastes are subjected to the material•recycle and/or the chemical•recycle in response to the form and state of the wastes.

Figure 4:
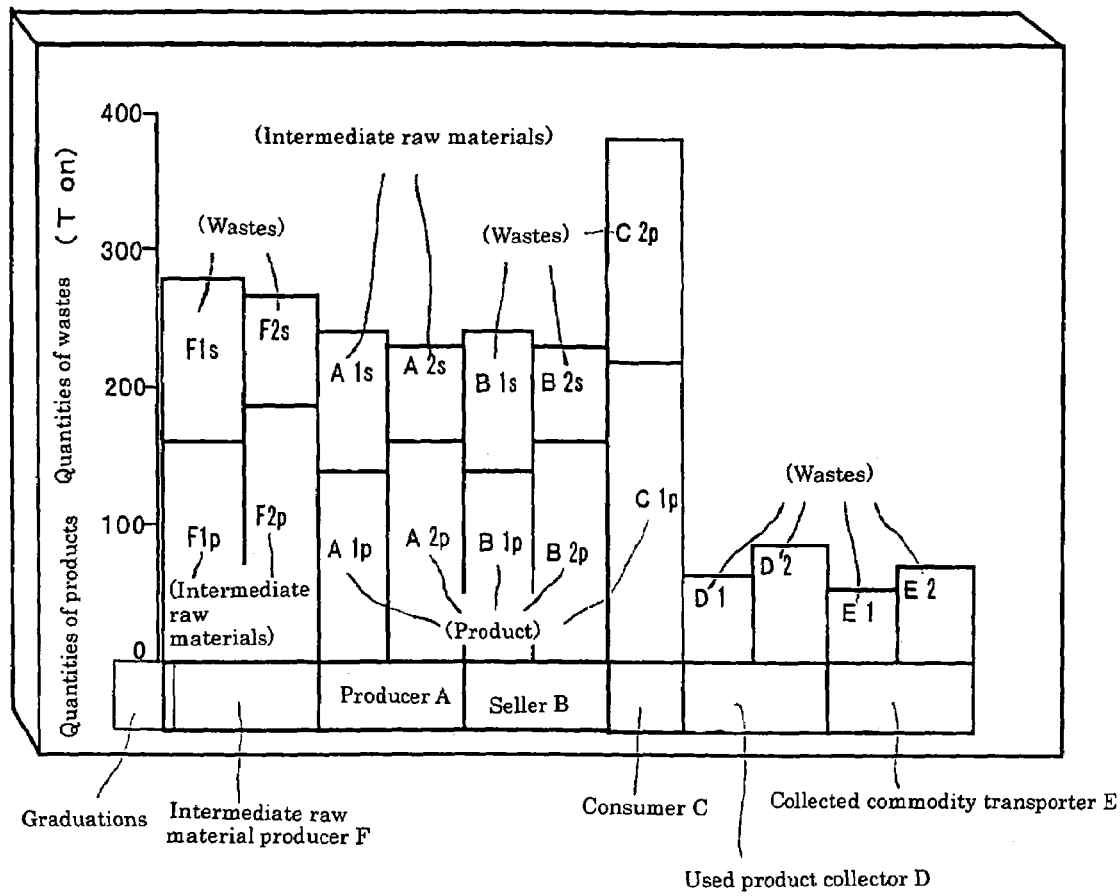
FIG. 4 is an example of computer screen showing the amounts of products and wastes which can be confirmed with the GVF network. (An example wherein the group members of each business are two companies is shown).
Figure 5:
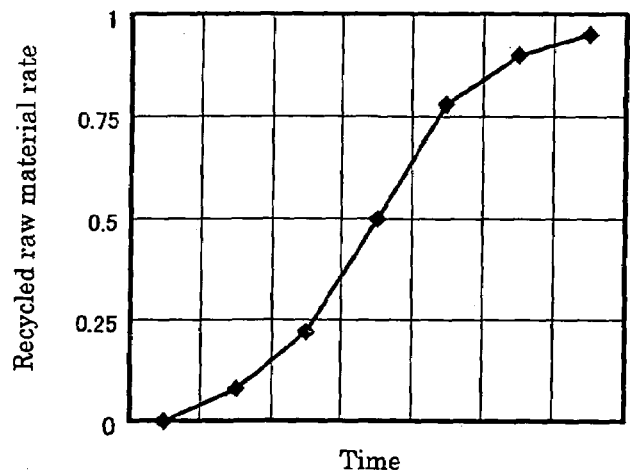
FIG. 5 is an example of the operation mixing rates of recycled raw material rates.

Subsequently, the intermediate raw material thus recycled by the intermediate raw material producer F is delivered to the above-described producer A for producing the product from the intermediate raw material. At this time, data necessary for management, such as the kind, quantity, production lot No., and recycled raw material use rate, are inputted into the database disposed in the server S on the GVF net with an input means attached to an information communication terminal or the like for each intermediate material delivery. The recycling information of the parts constituting the product, such as kinds, quantities, and constitutions, or the content of a recycling-inhibiting substance for inhibiting the recycling, are, if necessary, also inputted into the above-described database managed and controlled with the server S. Thereby, the management information related to the recycling can be taken out from the management standards set to the parts constituting the above-described product in the above-described database, and the taken management information can be referred to judge easily recyclable properties of the product and its constituent parts. When the producer A produces the product, the producer A may use not only the intermediate raw material (hereinafter, occasionally referred to as "recycled raw material") obtained from the wastes but also an intermediate raw material (hereinafter, occasionally referred to as "new raw material") using a natural material as a raw material (see FIG. 4). However, when both the these raw materials are used, a recycled raw material rate is determined using an expression: [(recycled raw material use quantity)/(recycled raw material use quantity+new raw material use quantity)×100], and this information is described in the above-described identification display. Incidentally, the operation mixing rates of the recycled raw material to the new raw material in GVF are shown in FIG. 5. As clearly shown in FIG. 5, the mixing rate is low at a GVF operation-starting time, but when the operation proceeds smoothly, a high recycled raw material rate of not less than 50 percent by weight is targeted. The raw material having a low mixing rate is used as a raw material to which an identification display can not be appended.

Finally, the information network manager G will be explained. The primary role of the information network manager G is to monitor the utilization state of the GVF net so that the GVF net is smoothly operated. Namely, the information network manager G monitors the whole management of GVF, such as the stay of the products and the wastes, the shortage of the wastes, troubles on the operation processes of the intermediate raw material producer F, the shortage of the intermediate raw materials in the product producer A, and a recycling promotion cost, and carries out support business for preventing a trouble on the distribution of the products and the wastes. The information network manager G further carries out the management of the pay acceptance or reception charges of wastes from persons except the GVF members, the setting of trade prices due to the employment of the new raw materials and the recycled raw materials, and the management of subsidies from cities, towns, villages, the country, and the like. Furthermore, the information network manager G fulfills a duty for adjusting the trade prices of the articles distributed among the producer A, the product seller B, the used product-collecting member D and the intermediate raw material producer F, while taking the above-described income and the management burden share of the information network manager G into account.

As described above, when the operation of the cycling system of the present invention proceeds smoothly, the system in which the consumer C bears a part of a sales price as a product-using cost and the residue is paid back to the consumer C can be realized. Thereby, the system can aid to construct a recycling-oriented society friendly to human beings and environments including animals and plants.

Hereinafter, the recycling method of the present invention and the system thereof for constructing the above-described recycling-oriented society friendly to the human beings and environments including the animals and the plants will more concretely be explained, but the present invention is never limited to these concrete examples. Additionally, characteristics used in the concrete examples were measured by the following methods.

(1). Intrinsic viscosity (hereinafter, occasionally referred to as IV)

A constant quantity of a sample cut out from pellets or formed articles was weighed, dissolved in o-chlorophenol in a concentration of 0.012 g/ml, and then measured at 25° C.

(2). Haze

A sample cut out from the trunk portion of a bottle and having a size of 50 mm×50 mm was measured with Color and color difference meter (MODEL 1001 DP) manufactured by Nippon Denshoku Kogyo Co.

(3). Method for identifying an inorganic compound as an identification compound.

Metal components in a resin composition were qualitatively and quantitatively analyzed with a fluorescent X-ray analyzer [System 3270, manufactured by Rigaku Denki Kogyo (Limited)].

(4). Content of acetaldehyde (hereinafter, also called AA).

The content of AA was determined by freezing and crushing a sample, charging the crushed sample into a vial container, leaving the sample at 150° C. for 60 minutes, and then measuring the sample with head space gas chromatography manufactured by Hitachi Co.

(5). Content of diethylene glycol (hereinafter, also called DEG)

A sample was decomposed with hydrazine and then measured with gas chromatography.

(6). Col-b

A constant volume of a sample was taken and then measured with a CM-7500 type color machine manufactured by Color Machine Co.

(7). Content (%) of EG, content (%) of impurities.

Impurities contained in EG which could be recycled by the chemical recycle were determined with gas chromatography (GC-7A, manufactured by Shimadzu Seisakusho Co., packing type column filler: Polyalkylene glycol 6000 produced by G. L. Science Corp.).

(8). Contents of DMT, MHET, HEPT

Impurities contained in recycled DMT were determined with gas chromatography (HP-5890, manufactured by Hewlett-Packard Corp., capillary column: TC-1701, produced by G. L. Science Corp.).

(9). Measurement of the kind of a plastic

The kind of a collected and received plastic was judged by an infrared analysis with Infra Spec NR 200, manufactured by Yokogawa Denki (Limited). In the case of a sample whose judgment was difficult, the kind of the sample was additionally measured with an infrared spectrophotometer (FTIR), manufactured by Shimadzu Seisakusho Co. having a probe for the measurement.

EXAMPLE 1

Futons (fibers) used by consumers and comprising a polyester were obtained from a collector and then used as a raw material to produce dimethyl terephthalate capable of being used as an intermediate raw material for polyester products. First, it was carried out by confirming the presence or absence of identification displays and the contents of the displays whether the raw material compositions of the futons could be accepted or not. Further, it was visually confirmed that the contamination of the futons with foreign matters, the staining of the futons with other substances such as an oil, and the like, did not exist in the futons, and a polyester composition was confirmed by an analysis using a near infrared analyzer. The compositions of the parts of the futons were as follows. In the futons, futon covers comprised 80 percent by weight of polyethylene terephthalate and 20 percent by weight of cotton. The futon main bodies comprised 70 percent by weight of polyethylene terephthalate and 30 percent by weight of cotton. The total content of the polyester in the raw material was 73 percent by weight. Further, by way of precaution, samples were collected from the various sites of the above-described futon wastes and mixed with each other, and a part of the obtained mixture was subjected to a laboratory test. Consequently, they were confirmed that a conversion reaction into a raw material proceeded and further that a chemical substance, such as a heavy metal, not passing the product standard was not contained.

Subsequently, 200 kg of the futons were separately charged into the first crusher whose screen diameter was set to 75 mm, and subjected to the first crushing treatment. The crushed product was charged into the second crusher whose screen diameter was set to 10 mm, and subjected to the second crushing treatment. The crushed product was subjected to an air separator to remove dusts and the like, centrifuged with a decanter, and then washed with water to remove sweat, urine and the like, and simultaneously collect the fiber wastes.

The collected fiber wastes were charged into a granulator operated in a condition of a granulator inner temperature of 170° C., solidified into flakes each having a diameter of 4 mm and a length of 45 mm, and then transported into a chemical•recycle reaction process with air. The bulk density and weight of said solidified product transported to the reaction process were 0.40 g/cm$^3$ and 195 kg, respectively. In the reaction process, said flakes were charged into a mixture of 800 kg of ethylene glycol preliminarily heated up to 185° C. with 5 kg of sodium carbonate, and then reacted at the atmospheric pressure for 4 hours. After the finish of the reaction, the reaction solution was cooled down to 80° and subjected to a solid-liquid separation to separate insoluble components. The separated liquid was distilled in conditions comprising at temperatures of 140 to 150° C. and a pressure of 13.3 kPa to obtain 600 kg of EG. Subsequently, 330 kg of the EG-removed residues were mixed with 5 kg of sodium carbonate and 280 kg of methanol and then reacted at 75 to 80° C. at the atmospheric pressure for one hour.

After the finish of the reaction, the reaction solution was cooled down to 40° C., and centrifugally separated into cakes consisting mainly of crude DMT and into the filtrate consisting mainly of the methanol and crude EG. The crude DMT was distilled and purified in conditions comprising a pressure of 6.8 kPa and a bottom temperature of 180 to 200° C. to obtain the purified DMT in a yield of 57.8%. The crude EG was also distilled and purified in conditions comprising a pressure of 13.1 kPa and a bottom temperature of 140 to 150° C. to obtain the purified EG in a yield of 59.5%. The appearance, acid value, melt colorimetry, and sulfate ash inspection items of the recycled DMT were equal to those of DMT on markets, and the diethylene glycol concentration, water content, and melt colorimetry inspection items of the recycled ethylene glycol were also equal to those of EG on markets.

Thus, the obtained DMT was produced in a total energy consumption of 75% based on a total energy consumption for DMT obtained from crude oil by conventional production methods.

The DMT was used to produce futon fibers through polymerization, filament production, and fiber production processes. The obtained futon fibers were confirmed not to contain a heavy metal and a chemical substance conflicting with product quality standards.

EXAMPLE 2

A raw material comprising used uniforms was subjected to operations similar to those of Example 1. The compositions of the uniforms were as follows. The composition of the front side fabrics comprised 80 percent by weight of polyethylene terephthalate and 20 percent by weight of cotton. The composition of the lining fabrics comprised 100 percent by weight of polyethylene terephthalate. The composition of buttons comprised 100 percent by weight of a polyacetal. The composition of rubber comprised 100 percent by weight of natural rubber. The compositions of other accessories such as name labels, zippers, and collar padding comprised 100 percent by weight of polyethylene terephthalate. The total content of the polyester in the raw material was 65 percent by weight. The yields of the obtained DMT and ethylene glycol were 55.2% and 59.2%, respectively. The recycled DMT and ethylene glycol were equal to those of DMT and ethylene glycol on markets.

EXAMPLE 3

A raw material comprising PET bottle bales classified and collected in a city, town or village was subjected to operations similar to those of Example 1. The compositions of the PET bottle bales were as follows. The composition of labels comprised 65 percent by weight of polystyrene and 35 percent by weight of polyethylene. The composition of caps comprised 100 percent by weight of polypropylene. The composition of the bottle main bodies comprised 100 percent by weight of polyethylene terephthalate. The total content of the polyester in the raw material was 91 percent by weight. The final yields of the DMT and ethylene glycol were 87.3% and 88.5%, respectively. The recycled DMT and ethylene glycol were equal to those of DMT and ethylene glycol on markets.

EXAMPLE 4

Operations similar to those of Example 1 except that polypropylene constituting the composition of caps and polyethylene constituting the composition of labels were evenly added to the PET bottles from the classified and collected PET bottle bales used in Example 3 were carried out. The polyester content of the PET bottle mixture raw material was 40%. The recycled DMT and ethylene glycol were equal to those of DMT and ethylene glycol on markets.

EXAMPLE 5

80 kg of wastes comprising used white shirts using a polyester were prepared. The composition of the used white shirts comprised 100 percent by weight of polyethylene terephthalate, and buttons and collar padding also comprised the polyethylene terephthalate. The wastes were separately charged into the first crusher whose screen diameter was set to 100 mm. The crushed product was then charged into the second crusher whose screen diameter was set to 40 mm. The crushed product was washed with water and then centrifuged with a decanter to remove the water and simultaneously collect fiber wastes. The collected fiber wastes were charged into a hot air dryer in a temperature condition of 130° C., treated for one hour to sufficiently remove the water, and then charged into a melt granulator. The melt granulator was operated in a state equipped with a vent vacuumized at −0.1 MPa, and at a melting point of 280° C. The melted polyethylene terephthalate was passed through an exclusive filter for removing fine foreign matters, extruded, and cooled in water. The cooled strand was cut with an exclusive cutter to obtain 76.2 kg of polyethylene terephthalate pellets. The pellets had the IV quality at a usable level similar to that of pellets on markets.

COMPARATIVE EXAMPLE 1

Operations similar to those of Example 1 were applied to a product which was obtained by adhering a sheet comprising 100 percent by weight of polyethylene terephthalate to a tile comprising 64.5 percent by weight of calcium carbonate and 35.5 percent by weight of polyethylene terephthalate and had a total polyester content of 38 percent by weight in the raw material. The appearance, acid value, melt colorimetry, and sulfate ash inspection items of the recycled DMT were equal to those of DMT on markets, and the diethylene glycol concentration, water content, and melt colorimetry inspection items of the recycled ethylene glycol were also equal to those of EG on markets. However, the final yields of the DMT and the ethylene glycol were 29.2.2% and 27.6%, respectively.

COMPARATIVE EXAMPLE 2

Operations similar to those of Example 1 were applied to a raw material comprising a load-cushioning material for transporting loads and having a total polyester content of 25% in the raw material. In the load-cushioning material, a rubber portion comprised 100 percent by weight of a polyurethane, and a cover comprised 100 percent by weight of cotton. A cushion comprised 31 percent by weight of a polyester and 69 percent by weight of cotton. The appearance, acid value, melt colorimetry, and sulfate ash inspection items of the recycled DMT were equal to those of DMT on markets, and the diethylene glycol concentration, water content, and melt colorimetry inspection items of the recycled ethylene glycol were also equal to those of ethylene glycol on markets. However, the final yields of the DMT and the ethylene glycol were 17.2% and 1.6%, respectively.

INDUSTRIAL APPLICABILITY

According to the above-described present invention can be provided the recycling system for recycling the used product wastes into the intermediate raw materials for producing products, whereby the products scarcely giving loads to environments, having improved sanitariness and safety, and suitable for recycling-oriented societies capable of supplying the products whose wastes can easily be recycled can be supplied to markets with reduced energy. In addition, the recycling system can save energy, and thereby exhibit an extremely remarkable effect which promotes the effective use of earth resources.

What is claimed is:

1. A recycling method for recycling a product partially or fully made from a polyester, wherein the product has an identification display being appended integrally to the product so as to recycle the product, comprises the following steps (a)-(d):

(a) a step in which an information communication terminal connected to at least a product producer, a product seller, a member for collecting the products, a member for transporting the products, and intermediate raw material producer is authenticated by a server computer so as to access to a database through a telecommunication network, wherein the database records informations necessary for recycling the product;

(b) a step in which the authenticated information communication terminal equipping with an input means inputs a product information retrieved from the identification display to the server computer, wherein the identification display shows that the product to be recycled satisfies a product standard from health and safety; an easily recyclable product standard, and a product standard based on an environmental load at a stage for producing the product and on an environmental load at a recycling stage;

(c) a step in which the server computer identifies the product by searching the databases based on the inputted product information, and the server computer reads a management information of the identified product related to recycling from the database, and further the server computer enables the information communication terminal freely to read the database through the telecommunication network in accordance with a privilege of the information communication terminal, if necessary, approves to write a recycling information required in a next stage to the database; and (d) a step in which the each information communication terminal and the server computer share the management information of the identification displays appended to recycled products, and supply the recyclable used products for recycling based on the shared management information.

2. The recycling method according to claim 1, wherein the easily recyclable property of said product is judged by evaluating the recyclable property of each of parts constituting said product, recording an evaluated recyclable property to form the database, and referring to said database from the part constitution of said product.

3. The recycling method according to claim 2, wherein the easily recyclable property of said product is judged by setting management standards related to the recycling of the parts constituting said product, and referring to said database from a part constitution satisfying said management standards.

4. The recycling method according to claim 2, wherein a content of a recycling-inhibiting substance for inhibiting the recycling for each of said parts is specified and then inputted into said database.

5. The recycling method according to claim 2, wherein said product has a composition satisfying the following expression (1)

$$([\alpha]1[\beta]1+[\gamma]1,\ldots[\omega]1)/X^*100 \geq 40 \quad (1)$$

(wherein, X is the weight of the product, $[\alpha]1$, $[\beta]1$, $[\gamma]1, \ldots [\omega]1$ are each a polyester content in each part).

6. The recycling method according to claim 5, wherein the composition of each part constituting said product is not less than 40 percent by weight of a polyalkylene terephthalate composition.

7. The recycling method according to claim 1, wherein the recyclable product distributed in a market is managed by giving management information related to the recycling, such as the raw materials, production date, production place, production lot No., weight, quality data, recyclable raw material employment rate, and recommended recycling method of the commodity product to said identification display, visually and/or electronically reading said management information, and, if necessary, adding new management information.

8. The recycling method according to claim 1, wherein a prescribed amount of refund is paid back to a consumer, when the management information contained in said identification display appended to the product used by the consumer is read and the product is consequently found to fit to prescribed standards.

9. The recycling method according to claim 1, wherein members including at least product producers, product sellers, members for collecting the used products, members for transporting the used products, and intermediate raw material producers, as constituent members, who jointly operate the system for recycling the products are connected to each other through the telecommunication network to share the management information of said identification displays appended to the recycled products.

10. The recycling method according to claim 9, wherein the server computer capable of reading and writing data for managing the products to be recycled is disposed on said telecommunication network to give in accessible, readable, and writable states necessary information related to the product specified by said display to the member accessed to a home page provided by said server, or, if necessary, to a non-member, in response to an authority given to each member or non-member.

11. The recycling method according to claim 10, wherein whether a bought used product can be recycled or not is evaluated by at least one evaluation means including a visual inspection using the identification display, a non-destructive inspection and/or a chemical analysis inspection.

12. The recycling method according to claim 11, wherein a receiving evaluation of the used product brought in by the non-member is approved by an information network manager integrally managing the operation of the recycling system.

13. The recycling method according to claim 1, wherein the product collected for the recycling is supplied to a material recycle and/or a chemical recycle.

* * * * *